US008038334B2

(12) United States Patent
Ishida

(10) Patent No.: US 8,038,334 B2
(45) Date of Patent: Oct. 18, 2011

(54) VEHICULAR HEADLAMP UNIT

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 584 days.

(21) Appl. No.: 12/248,244

(22) Filed: Oct. 9, 2008

(65) Prior Publication Data

US 2009/0103323 A1 Apr. 23, 2009

(30) Foreign Application Priority Data

Oct. 17, 2007 (JP) ................................ 2007-270489

(51) Int. Cl.
*B60Q 1/16* (2006.01)

(52) U.S. Cl. ........ 362/539; 362/518; 362/247; 362/297; 362/346; 362/507; 362/517; 362/538; 362/545; 362/298; 362/800

(58) Field of Classification Search .................. 362/518, 362/247, 297, 346, 507, 517, 538, 545, 516, 362/539, 296.01, 298–300, 307
See application file for complete search history.

(56) References Cited

U.S. PATENT DOCUMENTS

| | | | | |
|---|---|---|---|---|
| 6,607,295 | B2 * | 8/2003 | Hayakawa | 362/517 |
| 7,311,430 | B2 | 12/2007 | Tsukamoto et al. | |
| 7,387,416 | B2 | 6/2008 | Tsukamoto et al. | |
| 7,419,290 | B2 * | 9/2008 | Inaba | 362/538 |
| 7,597,465 | B2 * | 10/2009 | Inaba et al. | 362/538 |
| 7,665,872 | B2 * | 2/2010 | Nakabayashi | 362/545 |
| 7,712,936 | B2 * | 5/2010 | Nakada | 362/539 |
| 7,922,377 | B2 * | 4/2011 | Yamamichi et al. | 362/545 |
| 2004/0240223 | A1 | 12/2004 | Brun et al. | |
| 2007/0177400 | A1 * | 8/2007 | Tatsukawa | 362/514 |
| 2010/0246204 | A1 * | 9/2010 | Inaba | 362/539 |
| 2010/0277939 | A1 * | 11/2010 | Komatsu et al. | 362/516 |
| 2010/0277940 | A1 * | 11/2010 | Ishida | 362/538 |

OTHER PUBLICATIONS

Office Action issued in German Application No. 10 2008 051 915.4-54 dated Aug. 13, 2009 and English translation thereof, 10 pages.

* cited by examiner

*Primary Examiner* — Robert May
*Assistant Examiner* — Leah S Lovell
(74) *Attorney, Agent, or Firm* — Osha • Liang LLP

(57) ABSTRACT

A vehicular headlamp unit using a light-emitting element as a light source includes a projection lens on an optical axis that extends in a vehicle longitudinal direction, and first and second light source units arranged rearward of the projection lens. The first light source unit includes a first light-emitting element, a first reflector arranged to cover the first light-emitting element from above and structured to reflect light from the first light-emitting element forward toward the optical axis, and a first mirror component having an upward-facing reflective surface. The second light source unit includes a second mirror component including a downward-facing reflective surface, a second light-emitting element arranged on the second mirror component facing forward and diagonally downward, a second reflector structured to reflect light from the second light-emitting element upward, and a third reflector arranged downward of the second light-emitting element which reflects light from the second light-emitting element forward.

10 Claims, 6 Drawing Sheets

VEHICULAR HEADLAMP UNIT

BACKGROUND OF INVENTION

1. Field of the Invention

The present invention relates to a projector type vehicular headlamp unit that uses a light-emitting element such as a light-emitting diode as a light source.

2. Related Art

A number of projector type vehicular headlamp units that use a light-emitting element such as a light-emitting diode as a light source have been proposed in recent years.

Patent Documents 1 and 2 describe configurations in which such a vehicular headlamp unit is provided with a projection lens arranged on an optical axis that extends in a vehicle longitudinal direction, and first and second light source units arranged rearward of the projection lens.

In the vehicular headlamp unit described in these Patent Documents, the first light source unit includes a first light-emitting element, a first reflector, and a first mirror component. The first light-emitting element is arranged in a vicinity of the optical axis further rearward than a rear-side focal point of the projection lens. The first reflector is arranged so as to cover the first light-emitting element from above and is structured so as to reflect light from the first light-emitting element forward toward the optical axis. The first mirror component has an upward-facing reflective surface that extends rearward generally along the optical axis from a vicinity of the rear-side focal point of the projection lens so as to reflect a portion of the reflected light from the first reflector upward. Lighting the first light source unit forms a first light distribution pattern whose upper end portion has a cut-off line that is an inverted projection image of a front end edge of the upward-facing reflective surface, whereby a low beam distribution pattern or a portion thereof is formed.

According to the vehicular headlamp unit described in Patent Document 1, a second light source unit includes a second mirror component, a second light-emitting element, and a second reflector. The second mirror component has a downward-facing reflective surface that extends diagonally downward toward a lamp rear side from the front end edge of the upward-facing reflective surface of the first mirror component. The second light-emitting element is arranged below the optical axis and faces forward and diagonally downward. The second reflector is structured so as to reflect light from the second light-emitting element upward, with such light generally converging in a region near the rear-side focal point of the projection lens on the downward-facing reflective surface of the second mirror component. The additional lighting of the second light source unit additionally forms a second light distribution pattern above the cut-off line of the low beam distribution pattern, whereby a high beam distribution pattern or a portion thereof is formed.

According to the vehicular headlamp unit described in Patent Document 2, the second light source unit includes the second light-emitting element, a third reflector, and an additional projection lens. The second light-emitting element is arranged facing downward in a vicinity of the optical axis. The third reflector converges and reflects light from the second light-emitting element forward. The additional projection lens is arranged in front of the third reflector. The additional lighting of the second light source unit additionally forms the second light distribution pattern so as to straddle the cut-off line of the low beam distribution pattern from above and below, whereby the high beam distribution pattern or a portion thereof is formed.

[Patent Document 1] U.S. Pat. No. 7,387,416

[Patent Document 2] U.S. Pat. No. 7,311,430

SUMMARY OF INVENTION

Adopting a vehicular headlamp unit such as described in the above Patent Documents 1 and 2 enables switching between a low beam and a high beam by turning the second light source unit on or off.

However, according to the vehicular headlamp unit described in Patent Document 1, the high beam distribution pattern is formed by the first light distribution pattern and the second light distribution pattern, which do not mutually overlap on either the top or bottom sides of the cut-off line. As a consequence, unless the front end edge of the upward-facing reflective surface of the first mirror component (i.e., an intersecting portion between the upward-facing reflective surface of the first mirror component and the downward-facing reflective surface of the second mirror component) is formed with good precision, a darkened portion will be formed in the high beam distribution pattern along the cut-off line.

Meanwhile, according to the vehicular headlamp unit described in Patent Document 2, when forming the high beam distribution pattern the second light distribution pattern is formed with respect to the first light distribution pattern so as to straddle the cut-off line thereof from above and below. As a consequence, a portion along the cut-off line can be prevented from darkening. However, a difference in contrast above and below the cut-off line of the first light distribution pattern cannot be adequately erased, even when the second light distribution pattern is superimposed.

Thus, these conventional vehicular headlamp units can be further improved for excellent visibility of the high beam distribution pattern from a distance.

The present invention was devised in light of the foregoing circumstances, and one or more embodiments of the present invention provide a lamp unit for a vehicular headlamp that is a projector type vehicular headlamp unit having first and second light source units arranged rearward of a projection lens and which is capable of achieving a high beam distribution pattern with excellent distant visibility that is formed by light radiated therefrom.

One or more embodiments of the present invention include various improvements to the configuration of the second light source unit.

Namely, a vehicular headlamp unit according to one or more embodiments of the present invention is a vehicular headlamp unit that uses a light-emitting element as a light source and is characterized by including:

a projection lens arranged on an optical axis that extends in a vehicle longitudinal direction, and first and second light source units arranged rearward of the projection lens, wherein the first light source unit includes a first light-emitting element arranged in a vicinity of the optical axis further rearward than a rear-side focal point of the projection lens, a first reflector arranged so as to cover the first light-emitting element from above and structured so as to reflect light from the first light-emitting element forward toward the optical axis, and a first mirror component having an upward-facing reflective surface that extends rearward generally along the optical axis from a vicinity of the rear-side focal point so as to reflect a portion of the reflected light from the first reflector upward, and the second light source unit includes a second mirror component having a downward-facing reflective surface that extends diagonally downward toward a lamp rear side from a front end edge of the upward-facing reflective surface, a second light-emitting element arranged on the second mirror component facing forward and diagonally downward below the optical axis, a second reflector structured so as to reflect light from the second light-emitting element upward and generally converge such light at a region in a vicinity of the rear-side focal point on the downward-facing reflective surface, and a third reflector arranged downward of the second light-emitting element which reflects light from the second light-emitting element forward so that such light passes through a lower space of the projection lens.

The light-emitting element used for the above first light-emitting element and second light-emitting element refers to a light source in element form having a light-emitting chip that emits light in plane in a general point configuration. The type of light-emitting element is not particularly limited, and a light-emitting diode, a laser diode, or the like may be employed, for example.

The above first light-emitting element is arranged facing upward in a vicinity of the optical axis. However, the first light-emitting element does not necessarily have to be arranged facing vertically upward.

The above second light-emitting element is arranged facing forward and diagonally downward below the optical axis. However, a specific inclination angle thereof is not particularly limited.

The upward-facing reflective surface of the above first mirror component is not particularly limited in terms of a specific reflective surface shape thereof provided that the upward-facing reflective surface is formed so as to extend rearward generally along the optical axis from a vicinity of the rear-side focal point of the projection lens, and is configured so as to reflect a portion of the reflected light form the first reflector upward.

The downward-facing reflective surface of the above second mirror component is not particularly limited in terms of a specific cross-sectional shape, an inclination angle, and the like thereof, provided that the downward-facing reflective surface is formed so as to extend diagonally downward toward the lamp rear side from the front end edge of the upward-facing reflective surface.

The above third reflector is not particularly limited in terms of a specific arrangement reflective surface shape, and the like thereof, provided that the third reflector is arranged downward of the second light-emitting element and is configured so as to reflect light from the second light-emitting element forward so that such light passes through a lower space of the projection lens.

As illustrated in the above configuration, the vehicular headlamp unit according to one or more embodiments of the present invention is provided with the projection lens arranged on the optical axis that extends in the vehicle longitudinal direction, and the first and second light source units arranged rearward of the projection lens. The first light source unit has the first light-emitting element the first reflector, and the first mirror component. The first light-emitting element is arranged in a vicinity of the optical axis further rearward than the rear-side focal point of the projection lens. The first reflector is arranged so as to cover the first light-emitting element from above, and is structured so as to reflect light from the first light-emitting element forward toward the optical axis. The first mirror component has the upward-facing reflective surface that extends rearward generally along the optical axis from a vicinity of the rear-side focal point of the projection lens so as to reflect a portion of the reflected light from the first reflector upward. Therefore, lighting of the first light source unit makes it possible to form a first light distribution pattern whose upper end portion has cut-off lines, which are inverted projection images of the front end edge of the upward-facing reflective surface of the first mirror component, whereby a low beam distribution pattern or a portion thereof can be formed.

Furthermore, in the vehicular headlamp unit according to one or more embodiments of the present invention, the second light source unit has the second mirror component, the second light-emitting element, the second reflector, and the third reflector. The second mirror component has the downward-facing reflective surface that extends diagonally downward toward the lamp rear side from the front end edge of the upward-facing reflective surface on the first mirror component. The second light-emitting element is arranged facing forward and diagonally downward below the optical axis. The second reflector is structured so as to reflect light from the second light-emitting element upward, and generally converge such light in a vicinity of the rear-side focal point of the projection lens on the downward-facing reflective surface of the second mirror component. The third reflector is arranged downward of the second light-emitting element, and reflects light from the second light-emitting element forward so that such light passes through a lower space of the projection lens. Therefore, added lighting of the second light source unit makes it possible to additionally form a second light distribution pattern using light reflected from the second reflector and form a third light distribution pattern using light reflected from the third reflector, whereby a high beam distribution pattern or a portion thereof can be formed.

In such case, the second light distribution pattern is formed so as to be adjacent to the first light distribution pattern on the upper side of the cut-of lines without overlapping. Therefore, a difference in contrast above and below the cut-off lines in the first light distribution pattern can be adequately softened by additionally forming the second light distribution pattern.

There may be cases where the intersecting portion between the upward-facing reflective surface of the first mirror component and the downward-facing reflective surface of the second mirror component is not formed with good precision, and results in a darkened portion formed along the cut-off lines in a light distribution pattern that combines the first light distribution pattern and the second light distribution pattern. However, because the third light distribution pattern is formed so as to straddle the cut-off lines from above and below, overlapping of the third light distribution pattern prevents the occurrence of such a darkened portion.

In the vehicular headlamp unit according to one or more embodiments of the present invention as described above, added lighting of the second light source unit additionally forms two inherently different light distribution patterns with respect to the first light distribution pattern. Therefore, a difference in contrast between the upper and lower sides of the cut-off lines in the first light distribution pattern can be adequately softened, and the darkening of a portion along the cut-off lines can be prevented from occurring.

Thus, light radiated from the vehicular headlamp unit according to one or more embodiments of the present invention can be used to form a high beam distribution pattern having excellent distant visibility.

Note that although the above cut-off lines are formed as inverted projection images of the front end edge of the upward-facing reflective surface on the first mirror component, the cut-off lines are not particularly limited in terms of a specific shape thereof. For example, shapes such as one formed from a cut-off line extending in the horizontal direction and a cut-off line extending diagonally upward from this horizontal cut-off line, and one formed in a stepped configuration by a pair of left and right horizontal cut-off lines arranged in a stepped fashion can be adopted.

According to the above configuration, integrally forming the first mirror component and the second mirror component can increase the precision of the mutual positional relationship between the first and second mirror components. Therefore, the second and third light distribution patterns formed by the second light source unit can be precisely formed in a predetermined positional relationship with the first light distribution pattern formed by lighting of the first light source unit. By adopting such a configuration, a more compact vehicular headlamp unit can be achieved and the number of parts reduced.

In the above configuration, the second reflector has a configuration in which a notched portion is formed in the rear end portion of the second reflector, and the third reflector is arranged such that light from the second light-emitting element passing through the notched portion is incident to the reflective surface. In such case, with the second and third reflectors arranged in a reasonable layout, much of the light from the second light-emitting element can be made incident to the second reflector or the third reflector.

According to the above configuration, the third reflector includes a reflective surface having a focal point that is a point in a vicinity of the second light-emitting element, and a vertical cross-sectional shape formed by a parabola whose axis is an axis line that extends generally parallel to the optical axis. In such case, the third light distribution pattern with a comparatively narrow vertical width can be formed by reflected light from the third reflector, whereby a darkened portion along the cut-off lines can be efficiently eliminated.

According to the above configuration, the third reflector includes a reflective surface having a vertical cross-sectional shape formed by an ellipse whose first focal point is a point in a vicinity of the second light-emitting element and whose second focal point is a predetermined point between the second light-emitting element and the projection lens. Moreover, arranged in a downward vicinity of the projection lens is an additional projection lens having an additional optical axis that extends generally parallel to the optical axis and also having a rear-side focal point that is a point in a vicinity of the second focal point. In such case, the third light distribution pattern with a comparatively narrow vertical width can be formed by reflected light from the third reflector radiated forward via the additional projection lens, whereby a darkened portion along the cut-off lines can be efficiently eliminated.

Other aspects and advantages of the invention will be apparent from the following description, the drawings and the claims.

DETAILED DESCRIPTION

Hereinafter, embodiments of the present invention will be described with reference to the attached drawings.

Figure 1:
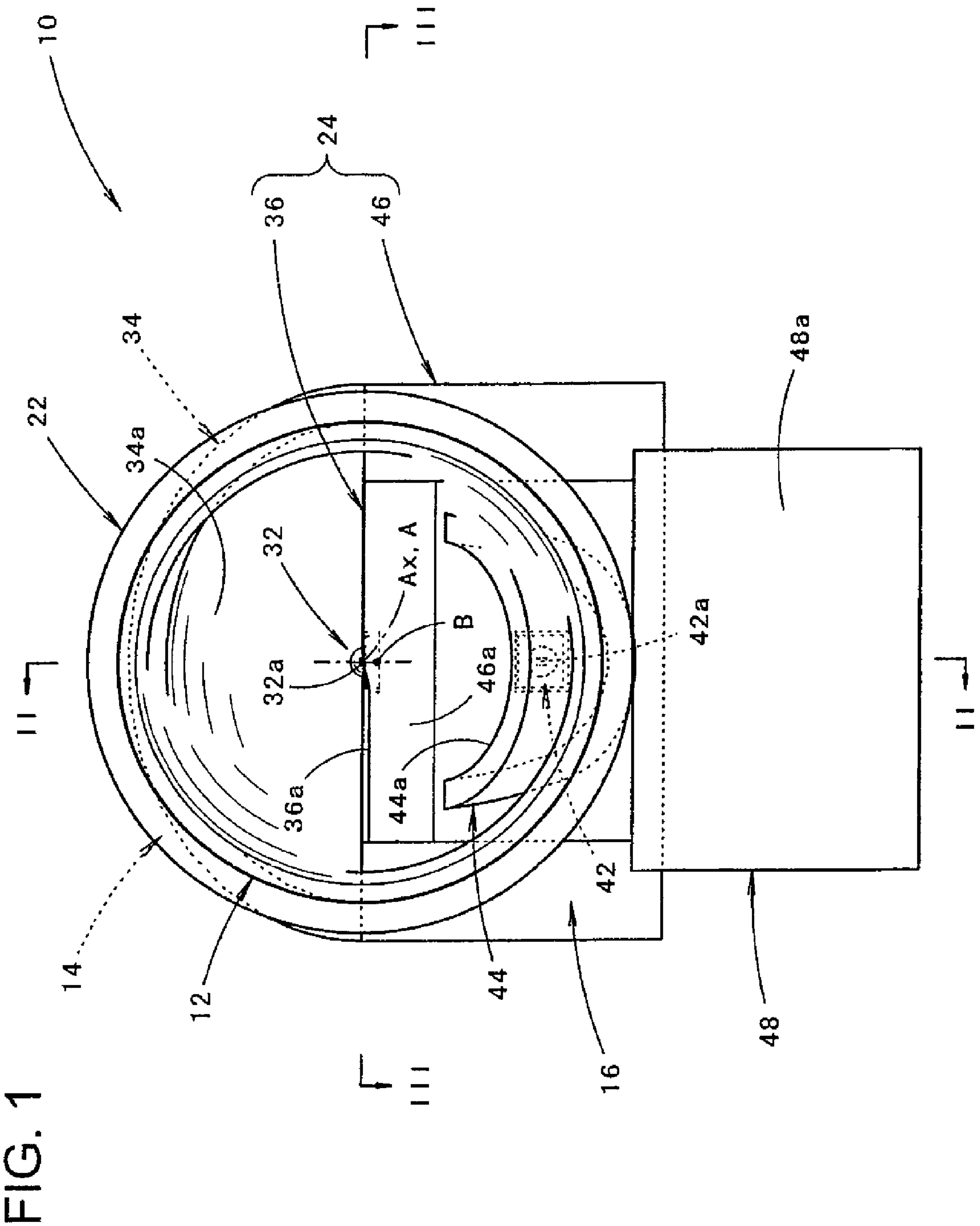
FIG. 1 is a frontal view showing a vehicular headlamp unit according to an embodiment of the present invention.
Figure 2:
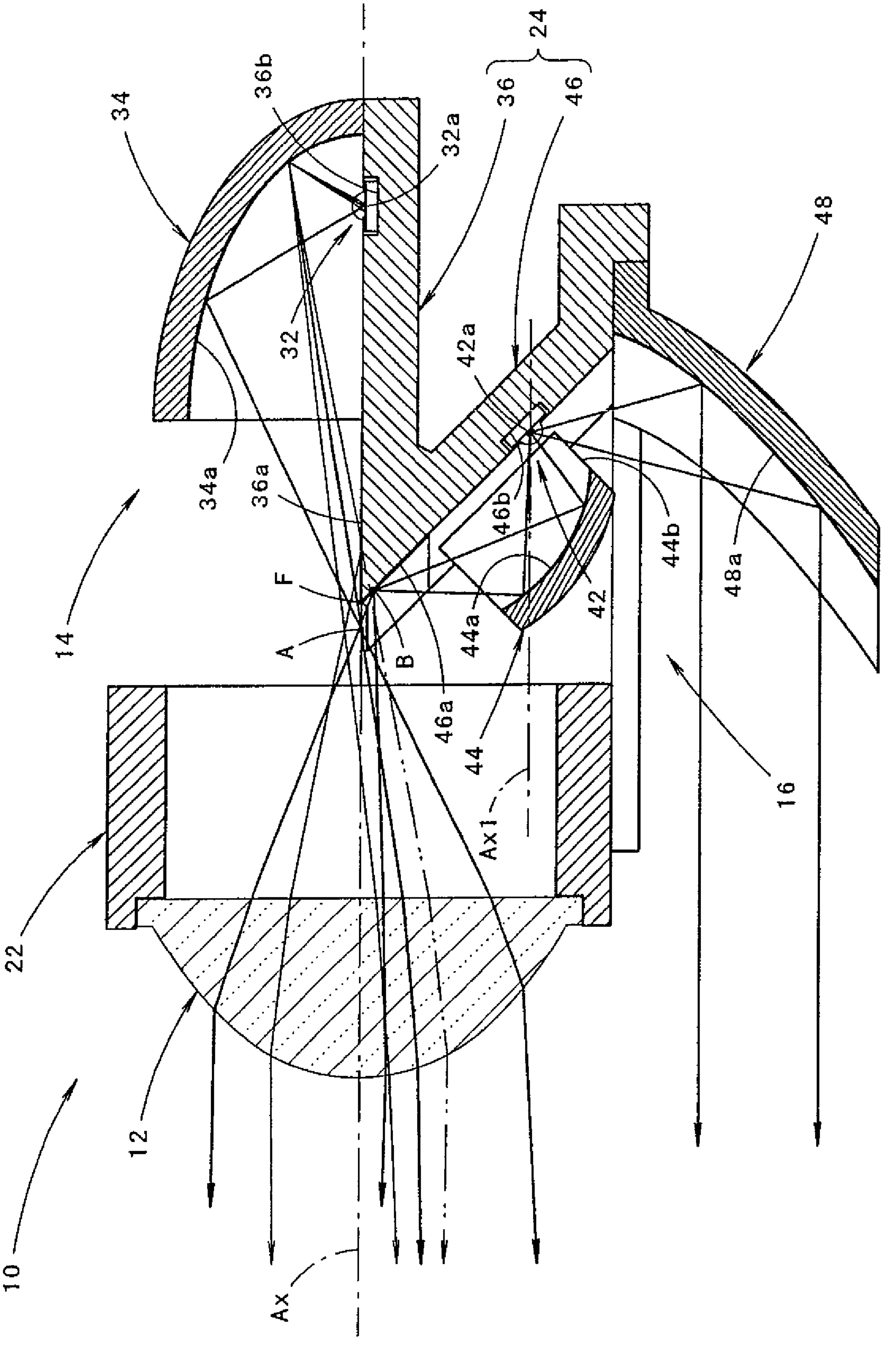
FIG. 2 is a cross-sectional view taken along a line II-II in FIG. 1.
Figure 3:
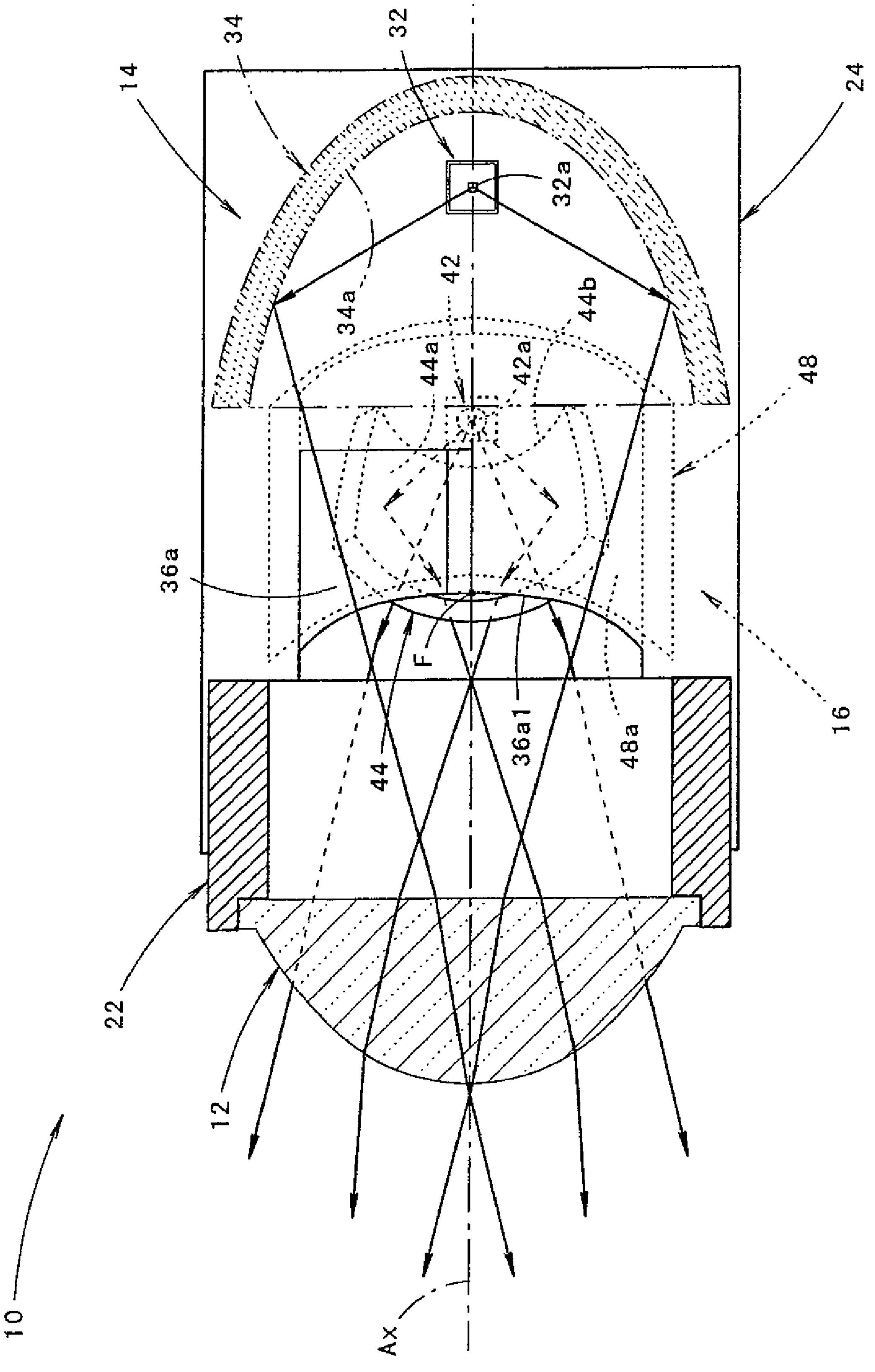
FIG. 3 is a cross-sectional view taken along a line III-III in FIG. 1.

FIG. 1 is a frontal view showing a vehicular headlamp unit 10 according to an embodiment of the present invention. FIG. 2 is a cross-sectional view taken along a line II-II in FIG. 1, and FIG. 3 is a cross-sectional view taken along a line III-III in FIG. 1.

As illustrated in these figures, the vehicular headlamp unit 10 is provided with a projection lens 12 arranged on an optical axis Ax that extends in a vehicle longitudinal direction, and first and second light source units 14, 16 arranged rearward of the projection lens 12.

The vehicular headlamp unit 10 is a vehicular headlamp unit used incorporated as a portion of a headlamp. In such an incorporated state with a headlamp, the vehicular headlamp unit 10 is arranged such that the optical axis Ax extends approximately 0.5 to 0.6 degrees downward with respect to the vehicle longitudinal direction.

The projection lens 12 is fixedly supported by a lens holder 22, and the lens holder 22 is fixedly supported by a light source unit holder 24. Also, the first and second light source units 14, 16 are fixedly supported by the light source unit holder 24.

The projection lens 12 is formed from a planoconvex aspherical lens, wherein a front-side surface is a convex surface and a rear-side surface is a plane surface. An image on a focal plane that includes a rear-side focal point F of the projection lens 12 is projected as an inverted image on a virtual vertical screen placed ahead thereof.

The first light source unit 14 has a first light-emitting element 32, a first reflector 34, and a first mirror component 36. The first light-emitting element 32 is arranged on the optical axis Ax further rearward than the rear-side focal point F of the projection lens 12. The first reflector 34 is arranged so as to cover the first light-emitting element 32 from above, and is structured so as to reflect light from the first light-emitting element 32 forward toward the optical axis Ax. The first mirror component 36 has an upward-facing reflective surface **36*a* that extends rearward along the optical axis Ax from the position of the rear-side focal point F so as to reflect a portion of the reflected light from the first reflector 34 upward. In such case, the first mirror component 36 is structured as a portion of the light source unit holder 24**.

The first light-emitting element 32 is a white light-emitting diode that has a square light-emitting chip **32*a* approximately 0.3 to 3 millimeters on each side. The first light-emitting element 32 is positionally fixed to a light source supporting concave portion 36*b*, which is formed on an upper surface extending rearward from the upward-facing reflective surface 36*a* of the first mirror component 36, with the light-emitting chip 32*a*** arranged so as to face vertically upward on the optical axis Ax.

A reflective surface **34*a* of the first reflector 34 has a major axis identical to the optical axis Ax, and is structured by a generally elliptical curved surface with a first focal point that is the center of light emission from the first light-emitting element 32. In such case, the reflective surface 34*a* has a vertical cross-sectional shape along the optical axis Ax set with an elliptical shape whose second focal point is a point A positioned slightly forward of the rear-side focal point F, and an eccentricity thereof is set so as to gradually increase from a vertical cross section toward a horizontal cross section. Accordingly, the first reflector 34 converges light from the first light-emitting element 32 on the point A within the vertical cross section, and moves the convergence position considerably forward within the horizontal cross section. The first reflector 34 is fixed to an upper surface of the first mirror component 36 at a peripheral lower end portion of the reflective surface 34***a*.

The upward-facing reflective surface 36*a* of the first mirror component 36 is formed by a mirror surface treatment such as aluminum evaporation applied to the upper surface of the first mirror component 36. In the upward-facing reflective surface 36*a*, a left-side region positioned to the left of the optical axis Ax is configured by a horizontal plane that includes the optical axis Ax, and a right-side region positioned to the right of the optical axis Ax is configured by a horizontal plane that is one step lower than the left-side region and connected via a short inclined surface. A front end edge 36*a*1 of the upward-facing reflective surface 36*a* is formed so as to extend along the focal plane including the rear-side focal point F. Thus, in the first mirror component 36, the upward-facing reflective surface 36*a* reflects upward a portion of reflected light heading from the reflective surface 34*a* of the first reflector 34 toward the projection lens 12. Such light is then incident to the projection lens 12 and radiated from the projection lens 12 as downward-facing light. Note that the upward-facing reflective surface 36*a* is formed within a range enabling reflected light from the first reflector 34 to enter from the front end edge 36*a*1 to a position that is a predetermined distance rearward.

The second light source unit 16 has a second mirror component 46, a second light-emitting element 42, a second reflector 44, and a third reflector 48. The second mirror component 46 has a downward-facing reflective surface 46*a* that extends diagonally downward toward a lamp rear side from the front end edge 36*a*1 of the upward-facing reflective surface 36*a* on the first mirror component 36. The second light-emitting element 42 is arranged on the second mirror component 46 facing forward and diagonally downward. The second reflector 44 is structured so as to reflect light from the second light-emitting element 42 upward, and generally converge such light at a point B positioned slightly diagonally downward from the rear-side focal point F on the downward-facing reflective surface 46*a*. The third reflector 48 is arranged downward of the second light-emitting element 42, and reflects light from the second light-emitting element 42 forward so that such light passes through a lower space of the projection lens 12. In such case, the second mirror component 46 is also structured as a portion of the light source unit holder 24.

The configuration of the second light-emitting element 42 is completely identical to the first light-emitting element 32. A light-emitting chip 42*a* is arranged so as to be generally on the same plane as the downward-facing reflective surface 46*a* of the second mirror component 46. With the light-emitting chip 42*a* in such a state, the second light-emitting element 42 is positionally fixed to a light source supporting concave portion 46*b* formed on a downward-facing inclined surface that extends diagonally downward from the downward-facing reflective surface 46*a*.

The second reflector 44 is arranged so as to cover the second light-emitting element 42 from a forward and diagonally downward side. A reflective surface 44*a* of the second reflector 44 has a major axis on a linear line that connects the point B and the center of light emission from the second light-emitting element 42, and is structured by a generally elliptical curved surface with a first focal point that is the center of light emission from the light-emitting element 42. In such case, the reflective surface 44*a* has a vertical cross-sectional shape along the major axis thereof set with an elliptical shape whose second focal point is the point B, and an eccentricity thereof is set so as to gradually increase from a vertical cross section toward both left and right sides. Accordingly, the second reflector 44 converges light from the second light-emitting element 42 on the point B with regard to an up-down direction, and softens the degree of convergence with regard to a left-right direction. The second reflector 44 is fixed to a downward-facing inclined surface of the second mirror component 46 at a peripheral rear end portion of the reflective surface 44*a*.

The downward-facing reflective surface 46*a* of the second mirror component 46 is structured by a plane inclined approximately 45 degrees with respect to a horizontal plane that includes the optical axis Ax. Thus, as illustrated in FIG. 3, in the second mirror component 46, the downward-facing reflective surface 46*a* reflects forward a majority of reflected light from the reflective surface 44*a* of the second reflector 44. Such light is then incident to the projection lens 12. Note that the downward-facing reflective surface 46*a* of the second mirror component 46 is formed within a range enabling reflected light from the second reflector 44 to enter up to a diagonally downward position that is a predetermined distance from the front end edge 36*a*1 of the upward-facing reflective surface 36*a* on the first mirror component 36.

The second reflector 44 is formed with a notched portion 44*b* on a rear end portion thereof The notched portion 44*b* is formed by cutting the second reflector 44 along a plane that is generally orthogonal to the downward-facing inclined plane of the second mirror component 46, and has a cut opening that is a generally semi-elliptical shape.

The third reflector 48 is arranged such that light from the second light-emitting element 42 passing through the notched portion 44*b* is incident to a reflective surface 48*a* of the third reflector 48.

The reflective surface 48*a* of the third reflector 48 has a focal point that is the center of light emission from the second light-emitting element 42, and a vertical cross-sectional shape formed by a parabola whose axis is an axis line Ax1 that extends parallel to the optical axis Ax. A horizontal cross-sectional shape of the reflective surface 48*a* is formed by a hyperbola whose axis is the axis line Ax1. In the vertical cross section, light from the second light-emitting element 42 is reflected as parallel light, and in the horizontal cross section, light from the second light-emitting element 42 is reflected as light diffused to both left and right sides.

Accordingly, the third reflector 48 radiates light from the second light-emitting element 42 forward of the vehicle intact without such light entering the projection lens 12. The third reflector 48 is fixedly supported on a lower end portion of the second mirror component 46 at a peripheral upper end portion of the reflective surface 48*a*.

Figure 4:
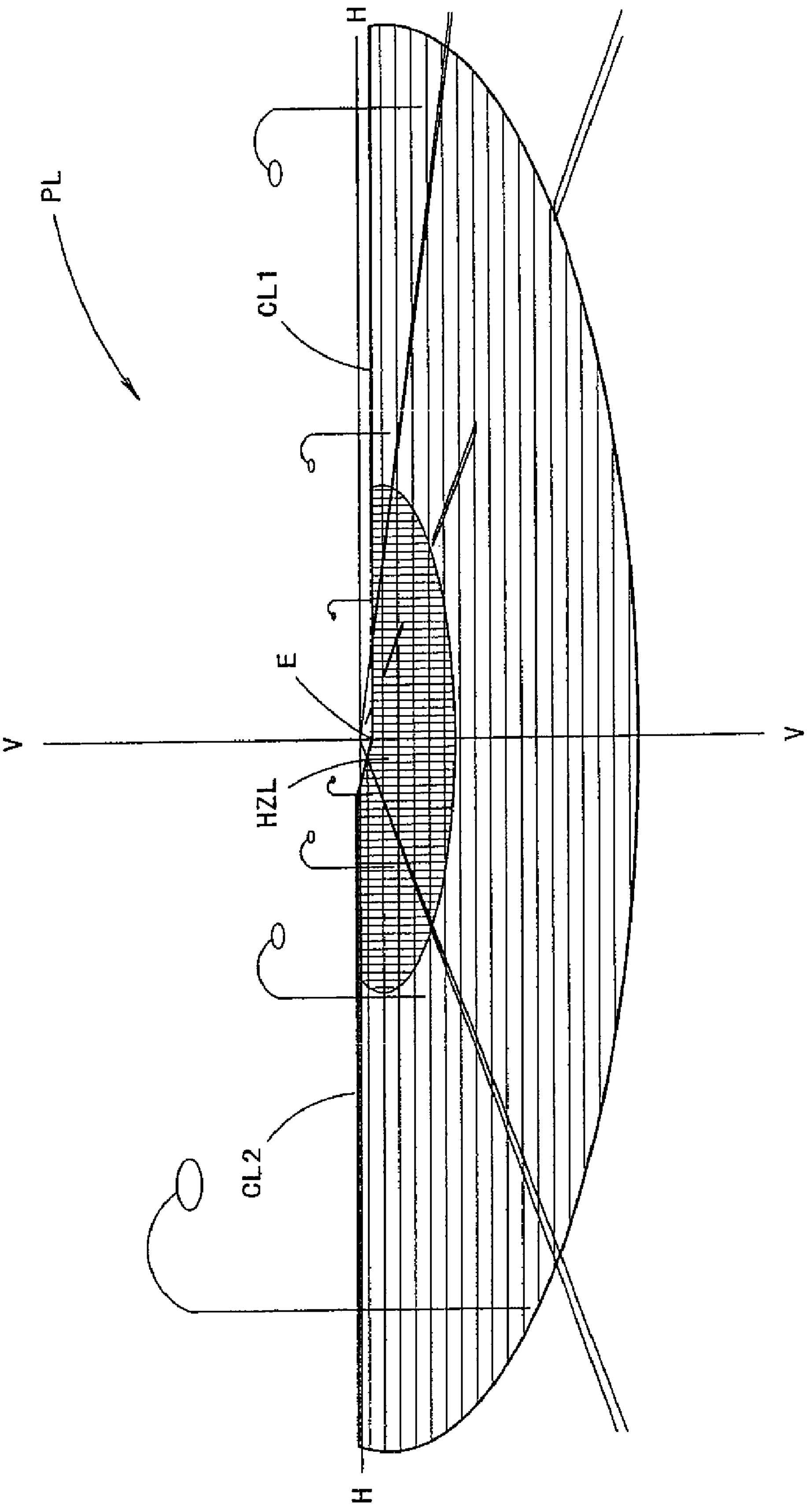
FIG. 4 is a view transparently showing a low beam distribution pattern formed on a virtual vertical screen positioned 25 meters in front of a vehicle by the light that is radiated forward from the vehicular headlamp unit.
Figure 5:
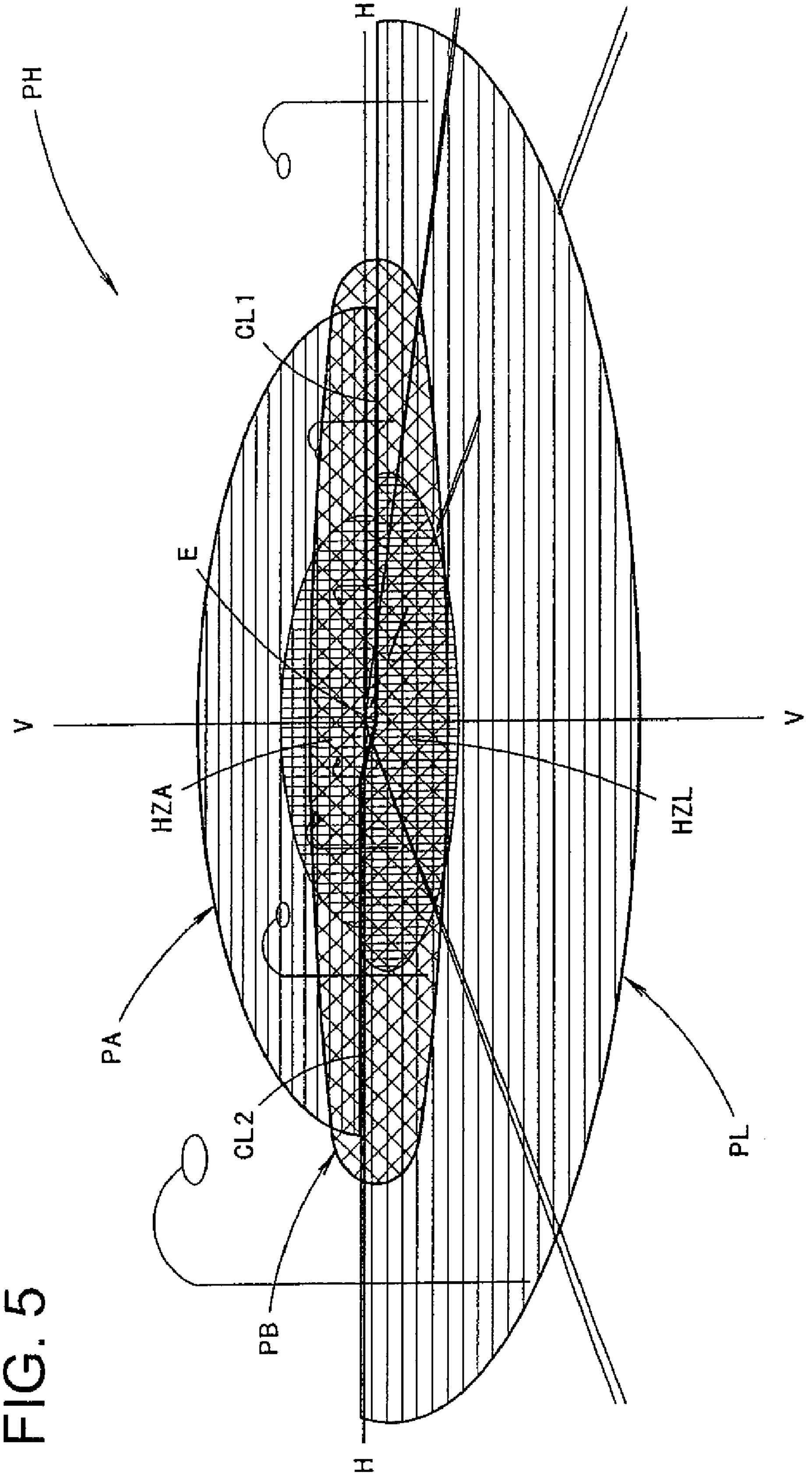
FIG. 5 is a view transparently showing a high beam distribution pattern formed on the virtual vertical screen by the light that is radiated forward from the vehicular headlamp unit.

FIGS. 4 and 5 illustrate light distribution patterns formed on virtual vertical screens positioned 25 meters in front of vehicle by the light that is radiated forward from the vehicular headlamp unit 10. FIG. 4 shows a low beam distribution pattern PL, and FIG. 5 shows a high beam distribution pattern PH.

The low beam distribution pattern PL shown in FIG. 4 is formed as a first light distribution pattern when the first light source unit 14 is lit.

The low beam distribution pattern PL is a low beam distribution pattern for left light distribution, and a top end edge thereof has cut-off lines CL1, CL2 that are formed in a stepped fashion in the left-right direction. The cut-off lines CL1, CL2 extend in the horizontal direction in a left-right stepped fashion and are bounded by a line V-V, which intersects in an orthogonal direction with a vanishing point in a lamp front direction, that is, H-V. A portion on an oncoming vehicle lane side that is right of the line V-V is formed as the lower step cut-off line CL1, and a portion on a host vehicle lane side that is left of the line V-V is formed as the upper step cut-off line CL2, which is a step higher than the lower step cut-off line CL1 due to an inclined portion.

The low beam distribution pattern PL is formed as an inverted projection image on the virtual vertical screen by the projection lens 12. The low beam distribution pattern PL is a projection of the image of the first light-emitting element 32 formed on the rear-side focal plane of the projection lens 12 by light radiated from the first light-emitting element 32 and reflected by the first reflector 34. The cut-off lines CL1, CL2 are formed as inverted projection images of the front end edge 36*a*1 of the upward-facing reflective surface 36*a* on the first mirror component 36.

In the low beam distribution pattern PL, an elbow point E at the intersection of the lower step cut-off line CL1 and the line V-V is positioned below H-V by approximately 0.5 to 0.6 degrees. This is because the optical axis Ax is, as described above, set downwardly by approximately 0.5 to 0.6 degrees with respect to the vehicle longitudinal direction. A hot zone HZL that is an area of high intensity light is formed in the low beam distribution pattern PL so as to surround the elbow point E.

The high beam distribution pattern PH shown in FIG. 5 is formed when simultaneously lighting the first and second light source units 14, 16.

The high beam distribution pattern PH is formed as a light distribution pattern that combines the low beam distribution pattern PL and two additional high beam distribution patterns PA, PB that are additionally formed with respect to the low beam distribution pattern PL. In such case, the additional high beam distribution pattern PA is a light distribution pattern formed as a second light distribution pattern by reflected light from the second reflector 44, and the additional high beam distribution pattern PB is a light distribution pattern formed as a third light distribution pattern by reflected light from the third reflector 48.

The additional high beam distribution pattern PA is formed so as to expand upward from the cut-off lines CL1, CL2 of the low beam distribution pattern PL. In this case, the additional high beam distribution pattern PA is formed as a smaller light distribution pattern than the low beam distribution pattern PL, and a lower end portion thereof is formed along the cut-off lines CL1, CL2. A hot zone HZA that is an area of high intensity light is formed in the additional high beam distribution pattern PA so as to surround the elbow point E. A hot zone of the high beam distribution pattern PH is created by this hot zone HZA and the hot zone HZL of the low beam distribution pattern PL.

The high beam distribution pattern PA is formed as a light distribution pattern smaller than the low beam distribution pattern PL because light from the second light-emitting element 42 reflected by the second reflector 44 is reflected forward in the vicinity of point B by the downward-facing reflective surface 46*a* of the second mirror component 46. Such light then passes through the rear-side focal plane of the projection lens 12 in the vicinity of the rear-side focal point F. In addition, the lower end portion of the high beam distribution pattern PA is formed along the cut-off lines CL1, CL2 because the downward-facing reflective surface 46*a* of the second mirror component 46 extends diagonally downward from the front end edge 36*a*1 of the upward-facing reflective surface 36*a* of the first mirror component 36 toward the lamp rear side.

The high beam distribution pattern PA is formed with respect to the low beam distribution pattern PL so as to be adjacent to the first light distribution pattern on an upper side of the cut-of lines CL1, CL2 without overlapping. Therefore, a difference in contrast between the upper and lower sides of the cut-off lines CL1, CL2 in the low beam distribution pattern PL is adequately softened.

However, unless an intersecting portion between the upward-facing reflective surface 36*a* of the first mirror component 36 and the downward-facing reflective surface 46*a* of the second mirror component 46 (i.e., the front end edge 36*a*1 of the upward-facing reflective surface 36*a*) is formed with good precision, a portion will be formed darkened along the cut-off lines CL1, CL2 in the light distribution pattern that combines the low beam distribution pattern PL and the additional high beam distribution pattern PA.

The additional high beam distribution pattern PB is formed so as to straddle the cut-off lines CL1, CL2 of the low beam distribution pattern PL from above and below. In such case, the additional high beam distribution pattern PB is formed as an oblong light distribution pattern that extends narrowly out to both left and right sides with the elbow point E as its center.

The additional high beam distribution pattern PB is formed as an oblong light distribution pattern that extends narrowly to both the left and right sides with the elbow point E as its center because light from the second light-emitting element 42 reflected by the third reflector 48 becomes light parallel with the optical axis Ax with regard to the up-down direction, and becomes light that diffuses to the left and right sides with respect to the horizontal direction.

The additional high beam distribution pattern PB is formed so as to straddle the cut-off lines CL1, CL2 from above and below. Therefore, even if a portion is formed darkened along the cut-off lines CL1, CL2 in the light distribution pattern that combines the low beam distribution pattern PL and the additional high beam distribution pattern PA, overlapping of the additional high beam distribution pattern PB prevents the occurrence of such a darkened portion.

When incorporating the vehicular headlamp unit 10 according to one or more embodiments of the present into an actual headlamp, the design incorporates a plurality of vehicular headlamp units 10. Thus, the low beam distribution pattern and the high distribution pattern of the entire headlamp are formed as a light distribution pattern in which there is multiple overlapping of the low beam distribution pattern PL and the high beam distribution pattern PH shown in FIGS. 4 and 5. Provided that light flux from the light source, namely, the first light-emitting element 32 and the second light-emitting element 42, can be adequately secured, it is possible to also structure the headlamp using a single vehicular headlamp unit 10.

As described above, the vehicular headlamp unit 10 according to one or more embodiments embodiment is provided with the projection lens 12 arranged on the optical axis Ax that extends in the vehicle longitudinal direction, and the first and second light source units 14, 16 arranged rearward of the projection lens 12. The first light source unit 14 has the first light-emitting element 32, the first reflector 34, and the first mirror component 36. The first light-emitting element 32 is arranged on the optical axis Ax further rearward than the rear-side focal point F of the projection lens 12. The first reflector 34 is arranged so as to cover the first light-emitting element 32 from above, and is structured so as to reflect light from the first light-emitting element 32 forward toward the optical axis Ax. The first mirror component 36 has the upward-facing reflective surface 36*a* that extends rearward along the optical axis Ax from the position of the rear-side focal point F of the projection lens 12 so as to reflect a portion of the reflected light from the first reflector 34 upward. Therefore, lighting of the first light source unit 14 can form the low beam distribution pattern PL whose upper end portion has the sharp cut-off lines CL1, CL2, which are inverted projection images of the front end edge 36*a*1 of the upward-facing reflective surface 36*a* of the first mirror component 36.

Furthermore, in the vehicular headlamp unit 10 according to one or more embodiments, the second light source unit 16 has the second mirror component 46, the second light-emitting element 42, the second reflector 44, and the third reflector 48. The second mirror component 46 has the downward-facing reflective surface 46*a* that extends diagonally downward toward the lamp rear side from the front end edge 36*a*1 of the upward-facing reflective surface 36*a* on the first mirror component 36. The second light-emitting element 42 is arranged downward of the optical axis Ax. The second reflector 44 is structured so as to reflect light from the second light-emitting element 42 upward, and generally converge such light at the point B in the vicinity of the rear-side focal point F of the projection lens 12 on the downward-facing reflective surface 46*a* of the second mirror component 46. The third reflector 48 is arranged downward of the second light-emitting element 42, and reflects light from the second light-emitting element 42 forward so that such light passes through a lower space of the projection lens 12. Therefore, added lighting of the second light source unit 16 makes it possible to additionally form the additional high beam distribution pattern PA using light reflected from the second reflector 44 and form the additional high beam distribution pattern PB using light reflected from the third reflector 48, whereby the high beam distribution pattern PH can be formed.

In such a case, the high beam distribution pattern PA is formed so as to be adjacent to the low beam distribution pattern PL on the upper side of the cut-off lines CL1, CL2 without overlapping. Therefore, a difference in contrast above and below the cut-off lines CL1, CL2 in the low beam distribution pattern PL can be adequately softened by additionally forming the additional high beam distribution pattern PA.

There may be cases in which the intersecting portion between the upward-facing reflective surface 36*a* of the first mirror component 36 and the downward-facing reflective surface 46*a* of the second mirror component 46 (i.e., the front end edge 36*a*1 of the upward-facing reflective surface 36*a*) is not formed with good precision. This results in a darkened portion formed along the cut-off lines CL1, CL2 in the light distribution pattern that combines the low beam distribution pattern PL and the additional high beam distribution pattern PA. However, because the additional high beam distribution pattern PB is formed so as to straddle the cut-off lines CL1, CL2 from above and below, even if a portion is formed darkened along the cut-off lines CL1, CL2 in the light distribution pattern that combines the low beam distribution pattern PL and the additional high beam distribution pattern PA, overlapping of the additional high beam distribution pattern PB prevents the occurrence of such a darkened portion.

In the vehicular headlamp unit 10 according to one or more embodiments as described above, added lighting of the second light source unit 16 additionally forms the two inherently different additional high beam distribution patterns PA, PB with respect to the low beam distribution pattern PL. Therefore, a difference in contrast between the upper and lower sides of the cut-off lines CL1, CL2 in the low beam distribution pattern PL can be adequately softened, and the darkening of a portion along the cut-off lines CL1, CL2 can be prevented from occurring.

Thus, light radiated from the vehicular headlamp unit 10 according to one or more embodiments can be used to form the high beam distribution pattern PH having excellent distant visibility.

According to one or more embodiments, the first mirror component 36 and the second mirror component 46 are integratedly formed as the light source unit holder 24. Therefore, it is possible to increase the precision of a mutual positional relationship between the first and second mirror components 36, 46. Thus, the additional high beam distribution pattern PA formed by the second light source unit 16 can be precisely formed in a predetermined positional relationship with the low beam distribution pattern PL formed by lighting of the first light source unit 14. Furthermore, integrally forming the first mirror component 36 and the second mirror component 46 can also achieve a more compact vehicular headlamp unit 10 and reduce the number of parts used.

In the second light source unit of the present embodiment, the second reflector 44 has a configuration in which the notched portion 44*b* is formed in the rear end portion of the second reflector 44, and the third reflector 48 is arranged such that light from the second light-emitting element 42 passing through the notched portion 44*b* is incident to the reflective surface 48*a*. Therefore, with the second and third reflectors 44, 48 arranged in a reasonable layout, much of the light from the second light-emitting element 42 can be made incident to the second reflector 44 or the third reflector 48.

Moreover, according to one or more embodiments, the third reflector 48 of the second light source unit 16 includes the reflective surface 48*a*, which has a focal point that is the center of light emission from the second light-emitting element 42, and a vertical cross-sectional shape formed by a parabola whose axis is the axis line Ax1 that extends parallel to the optical axis Ax. Therefore, the additional high beam distribution pattern PB with a comparatively narrow vertical width can be formed by reflected light from the third reflector 48, whereby a darkened portion along the cut-off lines CL1, CL2 can be efficiently eliminated.

By adopting the configuration of one or more embodiments as described above, the first light-emitting element 32 and the second light-emitting element 42 can be arranged at positions that are an adequate distance from one another. Therefore, it is possible to improve heat radiation performance with respect to the light-emitting elements 32, 42.

Note that according to the above embodiments, in order to make the additional high beam distribution pattern PB an oblong light distribution pattern, the horizontal cross-sectional shape of the reflective surface 48*a* of the third reflector 48 was described as a hyperbola. However, instead of such a configuration, the reflective surface 48*a* of the third reflector 48 can also be formed by a plurality of horizontal diffusive elements.

In the above embodiments, an axis of the parabola that forms the vertical cross-sectional shape of the reflective surface 48*a* of the third reflector 48 was described as the axis line Ax1 extending parallel to the optical axis Ax. However, an axis line that extends somewhat more upward or downward than the axis line Ax1 can also be used, provided that the axis line is within a range where the additional high beam distribution pattern PB is formed so as to straddle the cut-off lines CL1, CL2.

In the above embodiments, the second light-emitting element 42 was described as arranged on the second mirror component 46. However, the second light-emitting element 42 can also be a structure that is supported by a member other than the second mirror component 46, provided that the second light-emitting element 42 is arranged downward of the optical axis Ax.

Next, a modification of the above embodiments will be described.

Figure 6:
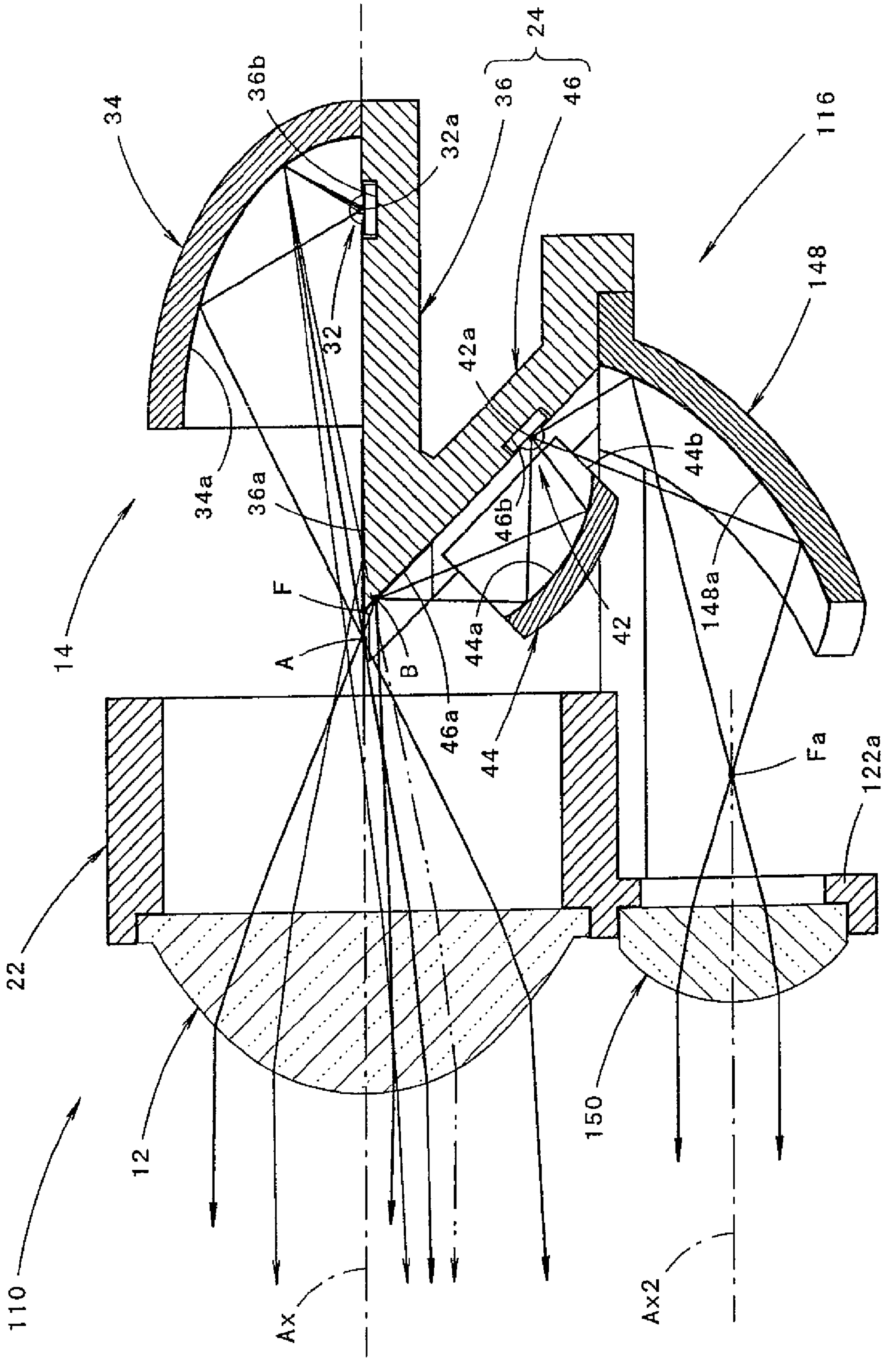
FIG. 6 is a view similar to FIG. 2 showing a vehicular headlamp unit according to a modification of the above embodiment.

FIG. 6 is a view similar to FIG. 2 showing a vehicular headlamp unit 110 according to the present modification.

As illustrated in the figure, the vehicular headlamp unit 110 is completely identical to the above embodiments with regard to the configuration of the projection lens 12 and the first light source unit 14, but differs from the above embodiments with regard to the configuration of a second light source unit 116.

Namely, the configurations of the second mirror component 46, the second light-emitting element 42, and the second reflector 44 in the second light source unit 116 of the modification are identical to those in the second light source unit 16 of the above embodiments; however, the configuration of a third reflector 148 differs from that of the third reflector 48 in the above embodiments. Furthermore, the second light source unit 116 has a configuration in which an additional projection lens 150 is arranged in front of the third reflector 148.

The additional projection lens 150 is positioned in a lower vicinity of the projection lens 12, and is fixedly supported by an additional holder **122*a* integrally formed with the lens holder 22. The additional projection lens 150 is formed from a planoconvex lens, wherein a front-side surface is a convex surface and a rear-side surface is a plane surface, and has an additional optical axis Ax2 that extends parallel to the optical axis Ax. The additional projection lens 150 projects an image on a focal plane that includes a rear-side focal point Fa of the additional projection lens 150** as an inverted image on a virtual vertical screen placed ahead thereof.

The third reflector 148 includes a reflective surface **148*a* having a vertical cross-sectional shape formed by an ellipse whose first focal point is the center of light emission from the second light-emitting element 42 and whose second focal point is a predetermined point between the second light-emitting element 42 and the projection lens 12 (more specifically, the position of the rear-side focal point Fa of the additional projection lens 150), and an eccentricity thereof is set so as to gradually increase from a vertical cross section toward a horizontal cross section. Accordingly, the third reflector 148 converges light from the second light-emitting element 42 on the rear-side focal point Fa of the additional projection lens 150** within the vertical cross section, and moves the convergence position considerably forward within the horizontal cross section.

Accordingly, the third reflector 148 enables light from the second light-emitting element 42 to enter the additional projection lens 150 arranged in the lower vicinity of the projection lens 12 without entering the projection lens 12, and radiates such light forward of the vehicle via the additional projection lens 150. The third reflector 148 is fixedly supported on the lower end portion of the second mirror component 46 at a peripheral upper end portion of the reflective surface **148*a***.

When adopting the configuration of the present modification, a third light distribution pattern with a comparatively narrow vertical width can be formed by reflected light from the third reflector 148 radiated forward via the additional projection lens 150 (namely, a light distribution pattern identical to the additional high beam distribution pattern PB in the above embodiment), whereby a darkened portion along the cut-off lines CL1, CL2 can be efficiently eliminated.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10, 110 VEHICULAR HEADLAMP UNIT
12 PROJECTION LENS
14 FIRST LIGHT SOURCE UNIT
16, 116 SECOND LIGHT SOURCE UNIT
22 LENS HOLDER
24 LIGHT SOURCE UNIT HOLDER
32 FIRST LIGHT-EMITTING ELEMENT
**32*a*, 42*a*** LIGHT-EMITTING CHIP
34 FIRST REFLECTOR
**34*a*, 44*a*, 48*a*, 148*a*** REFLECTIVE SURFACE
36 FIRST MIRROR COMPONENT
**36*a*** UPWARD-FACING REFLECTIVE SURFACE
**36*a*1** FRONT END EDGE
**36*b*, 46*b*** LIGHT SOURCE SUPPORTING CONCAVE PORTION
42 SECOND LIGHT-EMITTING ELEMENT
44 SECOND REFLECTOR
**44*b*** NOTCHED PORTION
46 SECOND MIRROR COMPONENT
**46*a*** DOWNWARD-FACING REFLECTIVE SURFACE
48, 148 THIRD REFLECTOR
**122*a*** ADDITIONAL HOLDER
150 ADDITIONAL PROJECTION LENS
A, B POINT
Ax OPTICAL AXIS
Ax1 AXIS LINE
Ax2 ADDITIONAL OPTICAL AXIS
CL1 LOWER CUT-OFF LINE
CL2 UPPER CUT-OFF LINE
E ELBOW POINT
F, Fa REAR-SIDE FOCAL POINT
HZA, HZL HOT ZONE
PA, PB ADDITIONAL HIGH BEAM DISTRIBUTION PATTERN
PH HIGH BEAM DISTRIBUTION PATTERN
PL LOW BEAM DISTRIBUTION PATTERN

What is claimed is:

1. A vehicular headlamp unit using a light-emitting element as a light source comprising:

a projection lens arranged on an optical axis that extends in a vehicle longitudinal direction, and first and second light source units arranged rearward of the projection lens, wherein the first light source unit comprises:

a first light-emitting element arranged in a vicinity of the optical axis further rearward than a rear-side focal point of the projection lens, a first reflector arranged so as to cover the first light-emitting element from above and structured so as to reflect light from the first light-emitting element forward toward the optical axis, and a first mirror component having an upward-facing reflective surface that extends rearward generally along the optical axis from a vicinity of the rear-side focal point so as to reflect a portion of the reflected light from the first reflector upward, and wherein the second light source unit comprises:

a second mirror component comprising a downward-facing reflective surface that extends diagonally downward toward a lamp rear side from a front end edge of the upward-facing reflective surface, a second light-emitting element arranged on the second mirror component facing forward and diagonally downward below the optical axis, a second reflector structured so as to reflect light from the second light-emitting element upward and generally converge the reflected light from the second reflector at a region in a vicinity of the rear-side focal point on the downward-facing reflective surface, and a third reflector arranged downward of the second light-emitting element which reflects light from the second light-emitting element forward so that such light passes through a space below the projection lens.

2. The vehicular headlamp unit according to claim 1, wherein the first mirror component and the second mirror component are integrally formed.

3. The vehicular headlamp unit according to claim 2, wherein a rear end portion of the second reflector is formed with a notched portion, and the third reflector is arranged such that light from the second light-emitting element passing through the notched portion of the second reflector is incident to a reflective surface of the third reflector.

4. The vehicular headlamp unit according to claim 2, wherein the third reflector includes a reflective surface having a focal point that is a point in a vicinity of the second light-emitting element, and a vertical cross-sectional shape formed by a parabola whose axis is an axis line that extends generally parallel to the optical axis.

5. The vehicular headlamp unit according to claim 2, wherein the third reflector includes a reflective surface having a vertical cross-sectional shape formed by an ellipse whose first focal point is a point in a vicinity of the second light-emitting element and whose second focal point is a predetermined point between the second light-emitting element and the projection lens, the vehicular headlamp unit further comprising:

an additional projection lens is arranged in a downward vicinity of the projection lens, the additional projection lens having an additional optical axis that extends generally parallel to the optical axis and also having a rear-side focal point that is a point in a vicinity of the second focal point.

6. The vehicular headlamp unit according to claim 1, wherein a rear end portion of the second reflector is formed with a notched portion, and the third reflector is arranged such that light from the second light-emitting element passing through the notched portion of the second reflector is incident to a reflective surface of the third reflector.

7. The vehicular headlamp unit according to claim 6, wherein the third reflector includes a reflective surface having a focal point that is a point in a vicinity of the second light-emitting element and a vertical cross-sectional shape formed by a parabola whose axis is an axis line that extends generally parallel to the optical axis.

8. The vehicular headlamp unit according to claim 6, wherein the third reflector includes a reflective surface having a vertical cross-sectional shape formed by an ellipse whose first focal point is a point in a vicinity of the second light-emitting element and whose second focal point is a predetermined point between the second light-emitting element and the projection lens, the vehicular headlamp unit further comprising:

an additional projection lens is arranged in a downward vicinity of the projection lens, the additional projection lens having an additional optical axis that extends generally parallel to the optical axis and also having a rear-side focal point that is a point in a vicinity of the second focal point.

9. The vehicular headlamp unit according to claim 1, wherein the third reflector comprises:

a reflective surface having a focal point that is a point in a vicinity of the second light-emitting element, and a vertical cross-sectional shape formed by a parabola whose axis is an axis line that extends generally parallel to the optical axis.

10. The vehicular headlamp unit according to claim 1, wherein the third reflector includes a reflective surface having a vertical cross-sectional shape formed by an ellipse whose first focal point is a point in a vicinity of the second light-emitting element and whose second focal point is a predetermined point between the second light-emitting element and the projection lens, the vehicular headlamp unit further comprising:

an additional projection lens is arranged in a downward vicinity of the projection lens, the additional projection lens having an additional optical axis that extends generally parallel to the optical axis and also having a rear-side focal point that is a point in a vicinity of the second focal point.

* * * * *